United States Patent
Pauling

(10) Patent No.: US 6,274,021 B1
(45) Date of Patent: Aug. 14, 2001

(54) METHOD FOR MAKING LAYER ELECTRODES

(75) Inventor: Hans Juergen Pauling, Oberderdingen (DE)

(73) Assignees: Stadtwerke Karlsruhe GmbH; EnBW Regional GmbH, both of Karlsruhe (DE)

(*) Notice: Subject to any disclaimer, the term of this patent is extended or adjusted under 35 U.S.C. 154(b) by 0 days.

(21) Appl. No.: 09/380,267
(22) PCT Filed: Feb. 25, 1998
(86) PCT No.: PCT/EP98/01071
§ 371 Date: Aug. 27, 1999
§ 102(e) Date: Aug. 27, 1999
(87) PCT Pub. No.: WO98/38356
PCT Pub. Date: Sep. 3, 1998

(30) Foreign Application Priority Data

Feb. 28, 1997 (DE) .............................. 197 08 208

(51) Int. Cl.⁷ .................................. C25D 21/12
(52) U.S. Cl. ................ 205/74; 205/67; 205/82; 205/101; 427/180
(58) Field of Search ............... 205/85, 87, 102, 205/128, 145, 83, 111, 155, 261, 244, 305, 560, 597, 602, 67, 74, 101, 82; 204/290.01; 427/180, 192

(56) References Cited

U.S. PATENT DOCUMENTS

| | | | |
|---|---|---|---|
| 4,120,758 | * 10/1978 | Rippere | 204/10 |
| 4,554,056 | 11/1985 | Whitford . | |
| 5,234,572 | * 8/1993 | Uchida et al. | 205/101 |
| 5,976,341 | * 11/1999 | Schumacher et al. | 205/101 |

FOREIGN PATENT DOCUMENTS 0 524 748   1/1993   (EP) .

OTHER PUBLICATIONS

Patent Abstracts of Japan, vol. 006, No. 024 (C–091), Feb. 12, 1982.

* cited by examiner

Primary Examiner—Kathryn Gorgos
Assistant Examiner—William T. Leader
(74) Attorney, Agent, or Firm—Jacobson Holman, PLLC

(57) ABSTRACT

The invention relates to a method and an apparatus for producing an electrode coating. The fundamental idea of the invention is to regulate in a time-defined manner at any instant during an electrolytic deposition process the concentration of the electrolyte constituents and additives in that in the electrolytic bath are provided additional electrodes, through which specific electrolyte constituents and/or additives can be taken up and/or delivered in time-controlled manner.

16 Claims, 1 Drawing Sheet

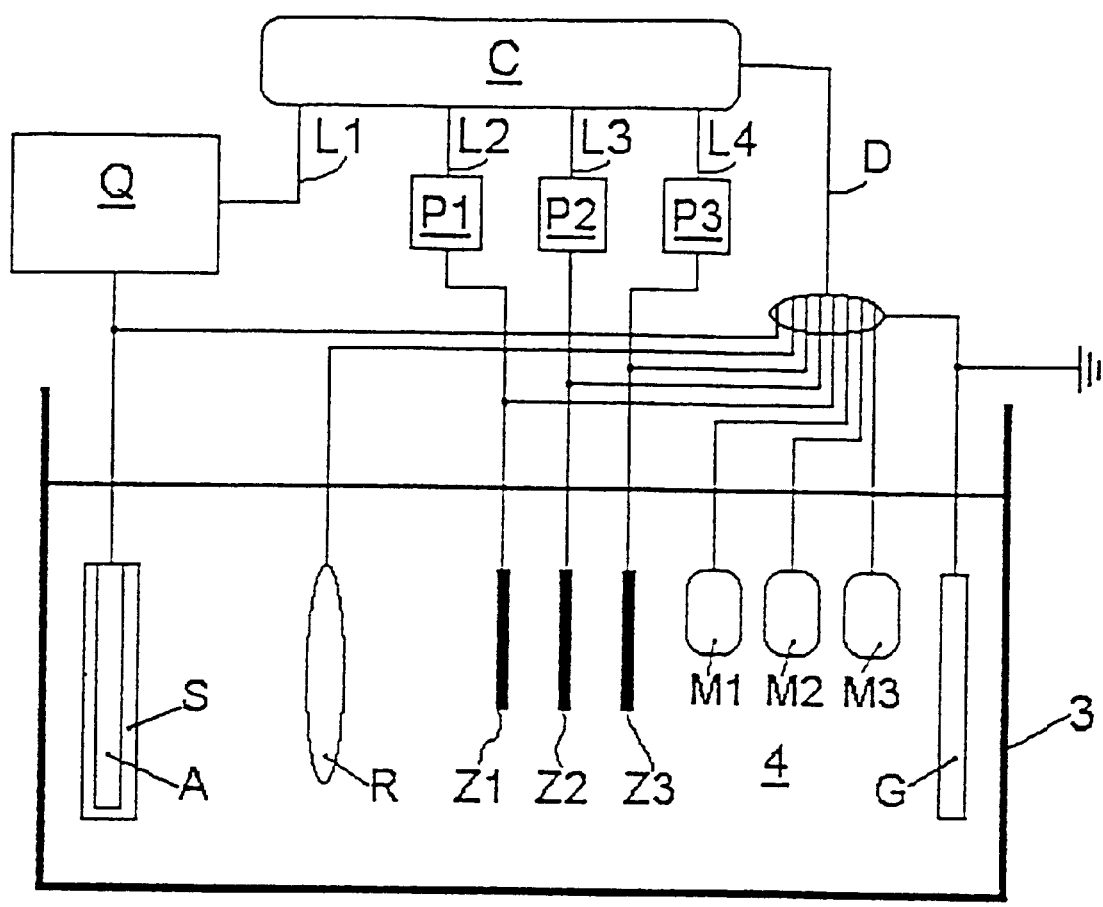

METHOD FOR MAKING LAYER ELECTRODES

BACKGROUND OF THE INVENTION

1. Field of the Invention

The invention relates to a method for producing a coating for an electrode and to an apparatus for producing a coating for an electrode.

2. Description of The Related Art

Battery and battery systems are becoming increasingly important for primary and secondary energy supply purposes. This increasing relevance is greatly influenced by the ever increasing demands for environmental compatibility of the energy supply systems in the sense of emission protection and reusability or recyclability of raw materials and energy.

This firstly applies to the end user and consequently private households and secondly also public installations, where in particular infrastructure and traffic is being equipped with more environmentally compatible energy sources. Already mobile equipment, such as e.g. portable mini-devices, as well as vehicles, especially road vehicles or rail or water vehicles are equipped with environmentally friendly, reusable or rechargeable energy sources in the form of accumulators or batteries. In addition, such energy sources in the form of battery systems are being increasingly used in immobile devices, such as e.g. stand-alone equipment or also as emergency power supplies.

In conjunction with the private end user and also public installations increasing use is being made of metal/air depolarized batteries as rechargeable primary batteries, e.g. in hearing aids or heart pacemakers, as well as in telecommunications engineering and signal installations.

In the further development of existing electrode systems for batteries, battery systems and in particular for rechargeable accumulators or batteries, increasing importance is being attached to the factor of being able to control in a clearly defined, predetermined manner the characteristics of the electrochemically active coating of such electrodes during their primary production. As a function of the intended use, very specific demands are made on the electrode or on the electrochemically active coating of an electrode and in order to fulfill the same specific conditions must be respected at the time of production.

This firstly applies to the surface structure of the electrochemically active coating and secondly e.g. to the specific composition of the electrochemically active coating.

From such primary characteristics of the electrode or the electrochemically active coating result secondary characteristics such as the suppliable energy density, i.e. the ratio of the available energy to the total mass, the environmental compatibility, the possible number of cycles of the rechargeability, the mechanical and/or chemical stability of the battery and in particular the electrodes in the operating or also inoperative state, together with many other physical and chemical charcteristics.

In the production of the electrochemically active coating of an electrode, which is generally carried out in an eletrolytic deposition process, with respect to the possible characteristics of the electrochemically active coating of the electrode very considerable importance is attached to the time pattern of the current and voltage. These electrical parameters determine the deposition and growth rate of the electrode coating.

However, decisive importance is also attached to the composition of the electrolyte, in which the electrolytic deposition process is performed and in particular the change to the electrolyte composition. During electrolytic deposition specific substances are used from and/or delivered to the electrolyte, so that there is a permanent change to the electrolyte composition during the deposition process. In certain circumstances this can considerably influence the quality of the electrochemically active coating of the electrode.

The deposition or growth of the electrochemically active coating can also be influenced by specific material additions in the electrolyte, said electrolyte additions only participating slightly or not at all in the actual deposition, but control the latter.

In order to adjust the concentration of the basic constituents of an electrolyte or the electrolyte additives, hitherto use has essentially been made of mechanical admixing methods, which were aided by time-spaced sampling operations and corresponding concentration measurements.

In such conventional methods for adjusting the concentrations of the individual electrolyte constituents and additives, a significant problem is that such a concentration adjustment can only be performed in an extremely imprecise manner and often with a significant time lag.

Thus, in the conventional adjusting or regulating processes, undesired and often prejudicial concentration fluctuations occurred, which in particular in the case of deposition methods performed in a critical concentration limit range, can often lead to inadequate surface structures or other characteristics of the electrochemically active electrode coating.

SUMMARY OF THE INVENTION

The object of the invention is to provide a method and an apparatus for producing a coating for an electrode by electrolytic deposition, in which the characteristics of the coating can be chosen and controlled in a particularly simple, precise and predetermined manner.

The method according to the invention for the production of a coating for an electrode comprises the successive steps of introducing a deposit support electrode into an electrolyte space, which is filled with an electrolyte and has a counterelectrode configuration, the electrical connection of the deposit support electrode to the counterelectrode configuration by means of a current/voltage source, the subsequent electrolytic deposition of a coating on the deposit support electrode and the separation of the coated deposit support electrode from the counterelectrode configuration and the subsequent removal of the coated deposit support electrode from the electrolyte space.

The electrolytic deposition of the coating on the deposit support electrode takes place by supplying for a predetermined time a current and/or voltage to the deposit support electrode and counterelectrode configuration.

According to the invention, the composition and/or the structure of the coating deposited on the deposit support electrode is controlled by adding electrolyte additives and that the concentrations of the electrolyte additives are time-controlled by means of additional electrodes in the electrolyte space, through which the additives can be taken up and/or delivered.

The fundamental idea of the method according to the invention for the production of a coating for an electrode is consequently to permanently control the concentrations of the electrolyte additives and/or constituents during the deposition process and consequently adapt and regulate in a desired manner the conditions under which the deposition process is performed. The electrolyte additives are adjusted by means of additional electrodes located in the electrolyte space, in that said additives are transferred from the solution of the electrolyte into the solid phase of the additional electrodes or are dissolved from the solid phase of the additional electrodes into the electrolyte. Thus, a planned and controlled enrichment and depletion can be brought about.

The starting concentration, particularly of the electrolyte additions, can be preset initially by mechanical charging or dosing.

It is advantageous to select the deposition conditions in such a way that the coating is deposited on the deposit support electrode by dendritic growth, in the form of a porous coating or in compact form.

A particularly simple control of the conditions in the electrolyte occurs if the deposit support electrode, the counterelectrode configuration and/or the additional electrodes are controlled and adjusted relative to a reference electrode configuration with respect to their electrical parameters. Thus, such a reference electrode configuration forms an invariable reference system, which has substantially constant characteristics throughout the deposition process, even if there should be a change to the composition of the electrolyte.

In controlling and checking the deposition process and the electrolyte characteristics, it is particularly appropriate and advantageous for there to be a central control and regulation of the setting of the deposit support electrode, counterelectrode configuration and additional electrodes relative to one another. Within the scope of this central control and regulation is also included the time sequence of deposition, use more particularly being made of a central control and regulating device. The latter can have a micro-processor, which permits a particularly rapid control and regulation, so as to substantially avoid fluctuations of the electrical parameters of the individual electrode configurations or concentrations of the constituents and additives of the electrolyte and also time delays.

It is also appropriate, at least during deposition, to determine or measure the concentrations of the electrolyte constituents and in particular the electrolyte additives. For this purpose use is made of e.g. sensitive sensors, which separately respond to individual constituents or additives, or also ion-sensitive electrodes. All these measuring devices supply measured values for the concentrations, which can be used for the feedback control and regulation of deposition and particularly the setting of the concentrations of the electrolyte constituents and additives.

There is also an indirect determination of the concentrations by means of the Nernst equation. In this connection, particularly for electrolyte additives, the potential changes at the metal electrodes of the particular additives are determined and evaluated and this is advantageously carried out in the microprocessor.

The method proves to be particularly advantageous in the production of electrode systems for metal/air depolarized batteries, particularly zinc/air depolarizated batteries. In this case from the electrolyte at least zinc is deposited on the deposit support electrode.

It is known that lead or lead compounds as electrolyte additives, particularly lead salts, influence the deposition of zinc during an electrolytic deposition process with respect to dendrite formation. Thus, the dendrite structure can be appropriately controlled and regulated during the deposition of zinc, if the electrolyte additive, which is taken up and/or delivered by the additional electrodes, is constituted by lead, lead compounds and in particular lead salts.

The concentration of lead or lead compounds is so adjusted and controlled in a concentration range that the depositing coating, particularly zinc coating is mechanically stabilized and only corrodes and/or self-discharges slightly when used in a battery.

Moreover, the concentration of lead or lead compounds, particularly lead salts, is so adjusted and controlled that the formation of dendrites is substantially not inhibited during the deposition of the coating.

The case frequently arises that on a specific, preferred support is desired a specific electrochemically active electrode coating and that in addition the desired support is unsuitable for participating in the deposition process. It is possible to remove the deposited, in particular dendritically grown coating from the deposit support electrode and to transfer and apply the removed coating to a separate support, namely the desired support and in particular pressing takes place. Thus, dendritically grown zinc can be knocked off, collected, washed and then applied by pressing to a desired support either within the electrolytic bath or following the production of the overall coating after the separation of the deposit support electrode.

Fundamentally, the apparatus according to the invention for the production of a coating for an electrode by electrolytic deposition, particularly in accordance with the above-desired method, has an electrolyte space fillable with an electrolyte, a deposit support electrode and a counterelectrode configuration, which is placed in the electrolyte space and is wettable by the electrolyte. There is also a current/voltage source for the electrical connection of the deposit support electrode and the counterelectrode configuration and for supplying current and/or voltage to the deposit support electrode and counterelectrode configuration for a predetermined time.

The apparatus according to the invention for the production of a coating for an electrode by electrolytic deposition is characterized in that at least one further additional electrode is provided for a time control of the electrolyte composition, i.e. the electrolyte constituents and additives. The at least one additional electrode is constructed for a time-controlled taking up and/or delivery of previously defined constituents and/or additives of the electrolyte.

As a result of these measures, it is possible with the inventive apparatus for the first time in a time-controlled manner, i.e. at any point in time during the deposition of the coating on the deposit support electrode, to adjust the concentrations of the constituents and/or the additives of the electrolyte in a clearly defined and predetermined manner.

This advantageously takes place in that the additional electrode is connectable to a voltage/current source and can be supplied with a current and/or lateral electrolysis, by choosing the voltage and current, to particularly easily adjust in time-controlled manner the delivery and/or taking up of given, desired or undesired constituents and/or additives in the electrolyte. As the current/voltage source it is possible to e.g. use in each case a potentiostat.

Generally, for each electrolytic process, which is to be precisely controlled and regulated, it is necessary to have a reference point, at least for the electrochemical potential. Thus, in the apparatus according to the invention, a reference electrode configuration is formed in the electrolyte space, by means of which the deposit support electrode, counterelectrode, configuration and additional electrodes can be adjusted and controlled with respect to said reference electrode configuration, particularly with respect to their electrical parameters.

A particularly easily coordinated control of the apparatus occurs if there is a central device, through which the voltage and/or current of the deposit support electrode, counterelectrode configuration and additional electrodes can be time-controllable and regulatable with respect to one another and particularly with respect to the reference electrode configuration.

A particularly simple processing occurs if the central control device in the apparatus has a microprocessor, because then the entire control process can be performed without any significant time lag.

Although it is fundamentally possible from the time pattern of all the electrical parameters of all the electrode configurations in the electrolyte space and also from the initial composition of the electrolyte to derive the time evolution of the concentrations of the constituents and additives of the electrolyte, it is particularly simple if measuring devices are provided for measuring the concentrations of specific constituents and/or additives of the electrolyte. These measuring devices can be constructed as ion-sensitive electrodes, e.g. as a potassium, calcium or pH-electrode, or as sensors sensitive to the specific constituents or additives.

An optimum control of the apparatuses takes place if the central control device is constructed for receiving all the data supplied by the measuring devices in connection with the concentration values and/or the electrical parameters of state of the deposit support electrode, counterelectrode configuration, additional electrodes and/or reference electrode configuration.

BRIEF DESCRIPTION OF THE DRAWING

The invention is described in greater detail hereinafter relative to a diagrammatic drawing based on a preferred embodiment of the apparatus. The single drawing shows an inventive apparatus for the production of a coating for an electrode by electrolytic deposition in the form of a diagrammatic, sectional side view.

DETAILED DESCRIPTION OF THE INVENTION

A deposit support electrode A and a counterelectrode configuration G are introduced into an electrolyte 4 in an electrolyte space 3. By means of a central control device C and a current/voltage source Q the deposit support electrode A and counterelectrode configuration G are electrically interconnected and here the counterelectrode configuration G is kept at earth or ground.

By means of the central control device C, by means of a control line L1 control signals are delivered to the current/voltage source Q, which in turn regulates the current and voltage during the deposition of the coating S on the deposit support electrode A.

In this embodiment there are also three additional electrodes Z1, Z2, Z3 which are electrically adjusted by means of potentiostats P1, P2 and P3, which are also regulated by a central control device C. The potentiostats P1, P2 and P3 are connected by means of control lines L2, L3, L4 to the central control device C. Besides the earth or ground connection, a reference system is also constituted by a reference electrode configuration R. For the determination of specific electrolyte constituents or additives, there are three ion-sensitive electrodes Ml, M2, M3 in this preferred embodiment.

The central control device C has a data line or a data bus D. Within said data bus D are the measuring lines from the ion-sensitive electrodes M1, M2, M3 and by means of said data bus D it is also possible to tap the time-variable, electrical parameters of the deposit support electrode A, additional electrodes Z1, Z2, Z3, counterelectrode configuration G and reference electrode configuration R and which are read into the central control unit C.

By means of the numerous measurement data in this way, it is constantly possible to evaluate the state in the electrolyte and configuration and a corresponding feedback control can take place.

The method and apparatus according to the invention for the production of a coating for an electrode are mainly suitable for the reconstruction and fundamental regeneration of so-called porous electrodes, particularly electrodes of the second type. These are electrodes in which a difficultly soluble salt participates at least as a charging and/or discharging product.

For example in the case of a Pb electrode (lead electrode), this can be $PbO$, $PbO_2$ or $PbSO_4$. In the known silver/silver chloride electrode AgCl is used as the difficultly soluble salt in the electrolyte.

Besides the so-called zinc eletrode of a zinc/air depolarized battery, the method and apparatus according to the invention can also be used on electrodes of Sn/Pb, $Sn/SnO_2$, $Ag/Z_n$, Ni/Cd and Ni/metal hydride accumulators or batteries.

Copper plates (Cu-plates) are particularly suitable as the deposit support electrode, e.g. due to their smooth surface which is advantageous for a scraping off of the dendrites produced and as a result of their low electrical resistance. During the deposition process, i.e. during electrolysis, the support material, i.e. the deposit support electrode is connected as a cathode and not as an anode, as during discharge. Therefore there is no need for a corresponding protective coating, here e.g. copper by nickel (Ni). All expanded metals, dross, metal plates and ceramics can be used as the support material and/or as the electric tap for such a deposit support electrode.

If in the alternative method the electrochemically produced dendrites are not removed from the deposit support electrode after production and are instead compacted and/or pressed on the support, then it must be ensured that the support material has an adequate chemical inertness, particularly with respect to anodic oxidation.

The necessary counterelectrodes can be fundamentally formed by all possible electrodes, which are electrochemically inert to an anodic oxidation.

The active material of the electrode to be regenerated, i.e. in particular the relevant metal, must naturally be present in the electrolyte and is in particular mechanically dosed in in the form of a salt with respect to the starting concentration.

Alternatively or with regards to an active material concentration to be maintained in the electrolyte, a corresponding metal electrode can be used as the counterelectrode and its material corresponds to that of the electrode to be regenerated and which for this reason is decomposed during the regeneration process, whereas the electrode to be regenerated is built up with respect to the active material. Thus, a relatively constant concentration of active material to be deposited can be ensured in the electrolyte. Thus, old, spent metal electrodes, whose electrical capacitance has greatly decreased, can be used as the counterelectrode for closing the material circuit relative to the active material to be deposited.

The corresponding electrolyte preferably has a concentration of approximately 3 to 10 mole/l and is alkaline. An electrolyte based on 6 molar potassium hydroxide solution is particularly suitable.

For improving e.g. the corrosion stability and/or the discharge behaviour, metals can be added as additives to the anodes or coatings to be deposited. This addition naturally takes place during electrochemical deposition through corresponding constituents or additives in the electrolyte. These added metals must in particular be anodically oxidizable in the alkaline range. They are in particular electrochemically dosed in via the additional electrodes by anodic dissolving of a corresponding metal electrode. The starting concentration of these additives can also be brought about by mechanical charging, e.g. by means of corresponding salts in the electrolyte solution. Examples for such additive metals are Hg, Cd, Ca, Sn, Pb and others.

As a result of the method and apparatus according to the invention, not only is it possible to very accurately regulate the concentration range of the just described additives in the electrolyte with respect to the production of loos dendrites for the reconstruction of porous electrodes, but can also be extended over the hitherto possible boundaries. This makes it possible for the first time, by briefly increasing the concentration of the additives beyond the existing maximum limits, particularly directly before the separation of the already deposited dendrites, to increase the frequency with which the dendrites produced are separated and increase the additive concentration in the active, deposited material and bring about more effective incorporation into the electrode material. It is a type of surface alloy of the electrochemically active, deposited material.

With regards to the regeneration and reconstruction of zinc electrodes for the zinc/air depolarized battery, lead is incorporated in a concentration between approximately 0.1 and approximately 5 wt. % in the electrochemically active coating to be deposited. The lead concentration in the electrolyte during the electrochemical regeneration process or during the basic reconstruction of the electrode coating is approximately 0.1 to approximately 2 wt. %. Perference is given to electrodes with approximately 1 wt. % lead in the electrode material and approximately 0.2 wt. % in the electrolyte bath during production.

A further advantage of the method and apparatus according to the invention is that the concentration of the material to be deposited in the electrolyte, i.e. in particular the metal to be desposited, can be precisely set and in particular can be kept constant. As has already been described, the starting value can be achieved through a mechanical dosing.

During the production and regeneration of zinc electrodes a concentration of approximately 1 to approximately 100 g/l can be set. Particularly good results are obtained with a concentration of approximately 20 g/l.

A temperature control or thermostatting of the electrolyte bath for maintaining specific, optimum temperature ranges can be appropriate, but is not vital. As a function of the ambient temperature and on the basis of the operating conditions during the regeneration process, the standard temperature range can be between approximately $-60°$ C. and approximately $+70°$ C. The upper temperature limit is determined by the casing and material used and in principle the boiling point of the electrolyte should not be exceeded.

The current densities necessary for a dendritic deposition extend within a range of approximately 100 mA/cm$^2$ to a few A/cm$^2$, referring here to the surface area on which the material is to be deposited.

The distance between the so-called deposit support electrode or working electrode and the counterelectrode is admittedly of secondary importance, but for high efficiency reasons should be kept as small as possible to avoid ohmic losses. In the production of zinc dendrites for porous electrodes, particularly good results are obtained with time-constant current densities of approximately 2 A/cm$^2$.

In the further processing of the deposited electrode coating on the deposit support electrode the coating, particularly the loose dendrites, are initially washed in water and soda water, in order to remove residues of the electrolyte from the electrochemically active material. Then, the electrochemically active material, particularly the loose dendrites, are pressed wet onto a suitable support. This is preferably carried out at 2a pressure of approximately 5 to approximately 250 kg/cm$^2$ electrode surface. Particularly favourable electrode surfaces are obtained relative to porous zinc electrodes in the range approximately 100 to approximately 200 kg/cm$^2$.

The dried, recoated electrode is then welded with a small-pored separator and inserted in a large-pored separator, particularly in a cassette.

The support material of the deposit support electrode or the corresponding other, desired support can be masked with a honeycomb structure during the pressing of the wet dendrites, in order to give the resulting electrode a particular mechanical stability during cyclizing, i.e. during cyclic discharging and charging. Naturally with respect to the pressing on the deposit support electrode, i.e. without support material change, the masking must be applied prior to dendrite production, i.e. prior to electrolytic deposition, to the support material of the deposit support electrode. It is then important that the corresponding masking or honeycomb structure is made from or at least correspondingly coated with either a nonconductive material or a material electrically insulated by coating and preferably electrochemically inert to anodic oxidation.

It is fundamentally possible to use the methods and apparatus according to the invention in regenerating compact electrodes for use as electrodes of the first type, namely so-called soluble electrodes.

For obtaining correspondingly compact deposits, correspondingly lower current densities must be respected, falling within a range between approximately 10 and approximately 100 mA/cm$^2$. It may also be necessary to use small-pored separators for suppressing electroosmotic effects and/or a continuous or intermittent convection of the electrolyte.

The electrochemically active surfaces of the deposit support electrode or working electrode and the counterelectrode should be of the same order of magnitude during the electrochemical regeneration of compact electrodes. This can in particular be achieved by a corresponding masking of the cathode for obtaining a roughly uniform field line distribution.

What is claimed is:

1. Method for the production of a coating for an electrode, having the steps of:

introducing a deposit support electrode into an electrolyte space filled with an electrolyte and with a counterelectrode configuration, introducing additional electrodes in the electrolyte space, the additional electrodes being capable of transferring electrolyte additives from the solution of the electrolyte to the additional electrodes and dissolving electrolyte additives from the additional electrodes into the electrolyte upon the application of current to the additional electrodes, electrical connection of the deposit support electrode to the counterelectrode configuration by means of a current source, electrical connection of the additional electrodes to the current source, electrolyte deposition of a coating on the deposit support electrode by supplying current and voltage for a predetermined time to at least the deposit support electrode and counterelectrode configuration, during said electrolyte deposition step, controlling the composition and structure of the coating deposited on the deposit support electrode by supplying the additional electrodes with current in a time-controlled matter to take up electrolyte additives from the electrolyte and to deliver electrolyte additives to the electrolyte, separating the coated deposit support electrode from the counterelectrode configuration, following said separating step, removing the coated deposit support electrode from the electrolyte space, following said step of removing the coated deposit support electrode removing the deposited coating from the deposit support electrode, and following said step of removing the deposited coating, transferring the removed coating and pressing it on a separate support.

2. Method according to claim 1, wherein a pressure of approximately 5 to 600 kg/cm$^2$ is used for pressing the removed coating.

3. Method according to claim 1, wherein the coating is deposited on the deposit support electrode by dendritic growth or in porous or compact form.

4. Method according to claim 1, wherein at least zinc is deposited from the electrolyte at the deposit support electrode.

5. Method according to claim 1, wherein lead or lead compounds are used as the electrolyte additive.

6. Method according to claim 5, characterized in that the concentration of lead or lead compounds is so adjusted and controlled in a concentration range that the coating is mechanically stabilized and is only subject to slight corrosion and self-discharging when used in a battery.

7. Method according to claim 6, wherein the concentration of lead or lead compounds is so adjusted and controlled that it substantially does not inhibit the formation of dendrites during the deposition of the coating.

8. Method according to claim 5, wherein the concentration of lead or lead compounds is so adjusted and controlled that it substantially does not inhibit the formation of dendrites during the deposition of the coating.

9. Method according to claim 1, wherein an electric current density of approximately 0.1 to approximately 10 A/cm$^2$ is used for depositing the coating.

10. Method according to claim 9, wherein an electric current density of approximately 2 A/cm$^2$ is used when depositing zinc.

11. Method according to claim 1, wherein the deposit support electrode, counterelectrode configuration and additional electrodes are controlled and adjusted relative to a reference electrode configuration.

12. Method according to claim 1, wherein adjustment of the deposit support electrode, counterelectrode configuration and additional electrodes with respect to one another is centrally controlled and regulated by a central control and regulating device.

13. Method according to claim 12, wherein the central control and regulating device is a microprocessor.

14. Method according to claim 1, wherein at least during deposition the concentration of the electrolyte constituents is determined by sensors sensitive to the individual constituents.

15. Method according to claim 14, wherein the measured concentrations are used for the concentration setting of the electrolyte constituents and additives.

16. Method according to claim 1, wherein lead salts are used as the electrolyte additive.

* * * * *